United States Patent [19]
Manzur et al.

[11] Patent Number: 5,170,377
[45] Date of Patent: Dec. 8, 1992

[54] 3-D MAPPING OF SALT DOMES

[75] Inventors: Akkas Manzur, Houston, Tex.; Karl O. Millahn, Kingston Upon Thames, England

[73] Assignee: Western Atlas International, Inc., Houston, Tex.

[21] Appl. No.: 855,720

[22] Filed: Mar. 20, 1992

Related U.S. Application Data

[63] Continuation of Ser. No. 748,571, Aug. 22, 1991, abandoned, which is a continuation of Ser. No. 497,495, Mar. 22, 1990, abandoned.

[51] Int. Cl.$^5$ .............................................. G01V 1/30
[52] U.S. Cl. ...................................... 367/73; 367/21; 364/421; 364/422
[58] Field of Search ...................... 367/21, 27, 57, 73; 364/421, 422

[56] References Cited

U.S. PATENT DOCUMENTS

| | | | |
|---|---|---|---|
| 3,483,505 | 12/1969 | Adair et al. | 340/15.5 |
| 4,330,873 | 5/1982 | Peterson | 367/73 |
| 4,393,488 | 7/1983 | Gassaway et al. | 364/421 |
| 4,397,005 | 8/1983 | Gassaway et al. | 364/421 |
| 4,803,668 | 2/1989 | Berryhill et al. | 367/421 |
| 4,803,669 | 2/1989 | Airhart | 367/56 |
| 4,835,745 | 5/1989 | Young et al. | 367/56 |
| 4,839,869 | 6/1989 | Corcoran | 367/73 |
| 4,870,580 | 9/1989 | Lang et al. | 364/421 |
| 4,887,243 | 12/1989 | Pann | 367/73 |
| 4,926,393 | 5/1990 | McClellan et al. | 367/57 |

OTHER PUBLICATIONS

Manzur, A.; "Delineation of Salt Masses Using Borehole Seismics"; Oil Gas J., vol. 83, No. 40, pp. 147-149, Oct. 7, 1985.
Wiggins et al.; "The Relation Between the VSP-CDP . . . Migration", 49th Eur. Ass. Explor. Geoph. Mtg., Yugo, Jun. 9, 1987, pp. 118-119.
Harrison, C. H.; "Three-Dimensional Ray Paths . . . Prvariants", J. Acoust. Soc. Amer., vol. 62, #6, pp. 1382-1388, Dec. 1977; abst. only founded.
Musgrave, A. W., Woolley, W. C., Gray, H., Outlining of Salt Masses by Refraction Methods, Geophysics, vol. XXV, No. 1, (Feb., 1960), pp. 141-167, 34 figures.
Wiggins, W., Ng, P., Manzur, A., The Relation Between the VSP-CDP Transformation and VSP Migration, paper presented at 56th Annual Meeting of the International Society of Exploration Geophysicists, Houston, Tex., Nov. 2-6, 1986.
Salt-Proximity Surveys, Publication No. 85-478 by Western Geophysical (a division of Litton), 1985.
Wiggins, W., Ng, P., Manzur, A., The Relation Between the VSP-CDP Transformation and VSP Migration (B-44), 49th Annual Meeting, Society of Exploration Geophysicists, Yugoslavia, Jun., 1987, pp. 118-119.
Sheriff, R. E., "Encyclopedic Dictionary of Exploration Geophysics"; 1975, T:N, 269, S54, pp. 9-10.

*Primary Examiner*—Nelson Moskowitz
*Attorney, Agent, or Firm*—E. Eugene Thigpen

[57] ABSTRACT

In accordance with the invention, there is provided a system for determining the location of an acoustic impedance boundary within the earth. A seismic signal is generated at a first location and detected at a second location so that the signal travels from the source to the acoustic impedance boundary and from the acoustic impedance boundary to the sensor. In a first embodiment, the travel time from source to receiver and the direction, in three dimensions, of the arrival path of the signal at the sensor are determined. Utilizing the determined direction of travel to the sensor and known information regarding the velocity profile of the earth strata between the source and the acoustic impedance boundary and between the receiver and the acoustic impedance boundary, a calculated travel path from the source to receiver is determined over which the calculated travel time substantially equals the measured travel time. The location of the acoustic impedance boundary is determined from the point of intersection of a calculated travel path extending from the source with a calculated travel path extending from the wellbore sensor.

7 Claims, 7 Drawing Sheets fig. 1a
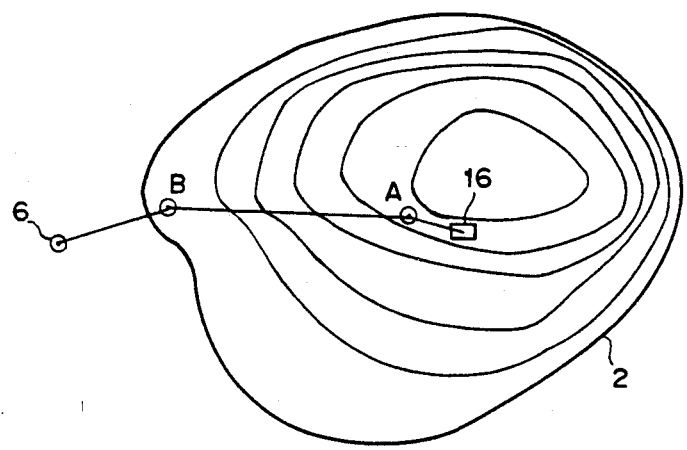
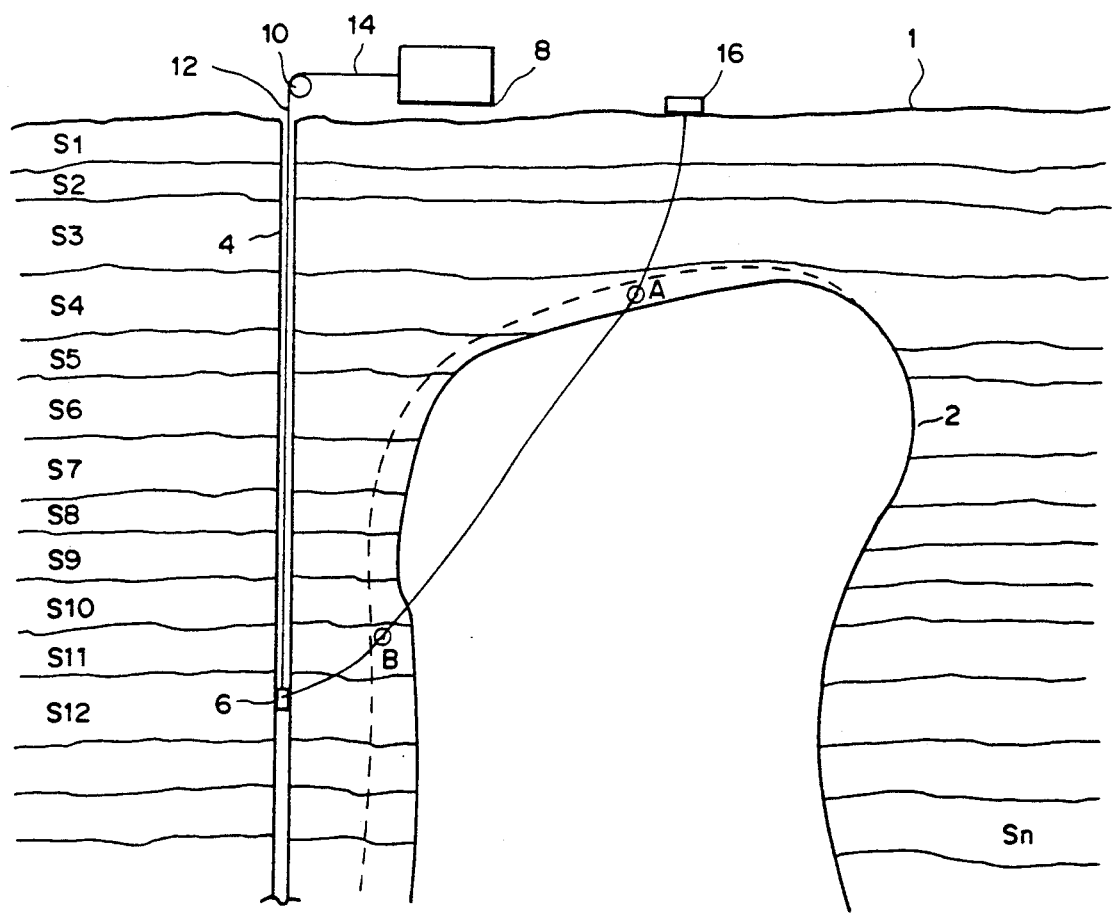
fig. 1b fig. 2a
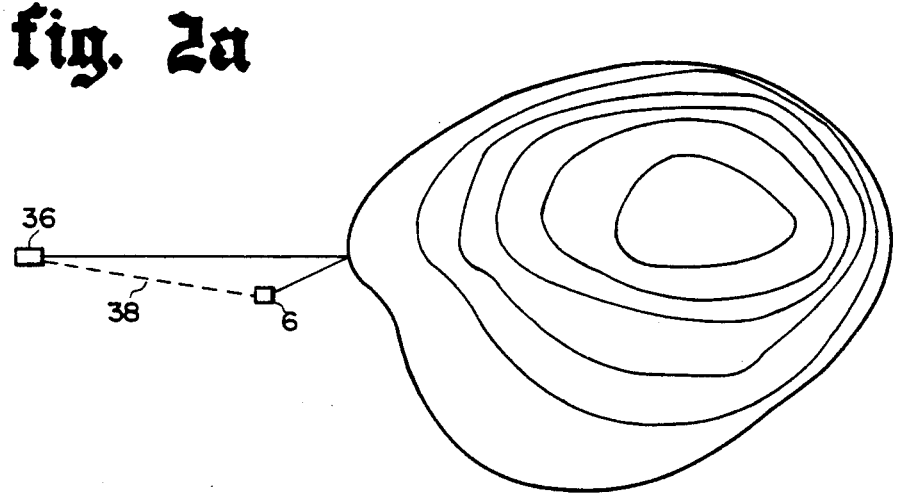
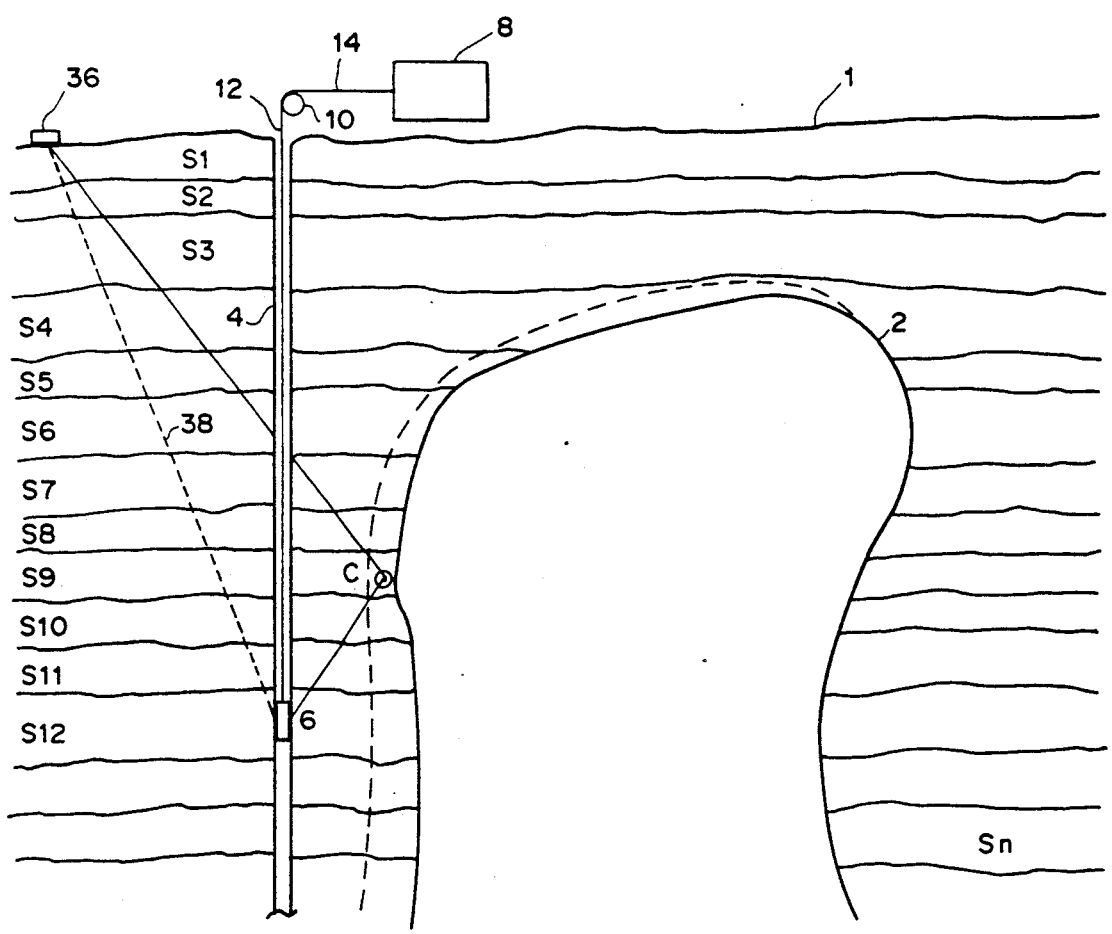
fig. 2b fig. 5a
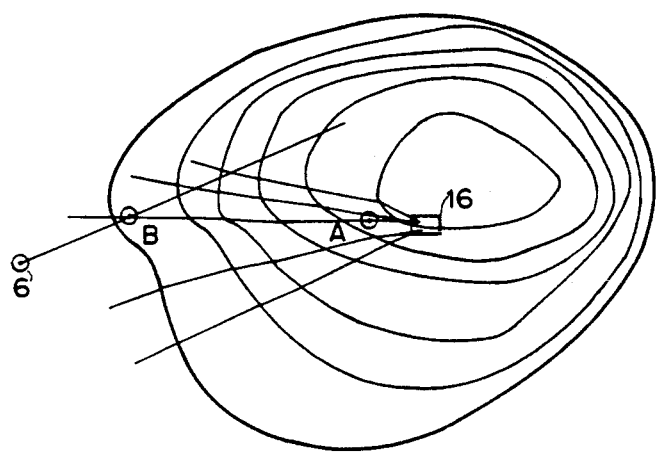
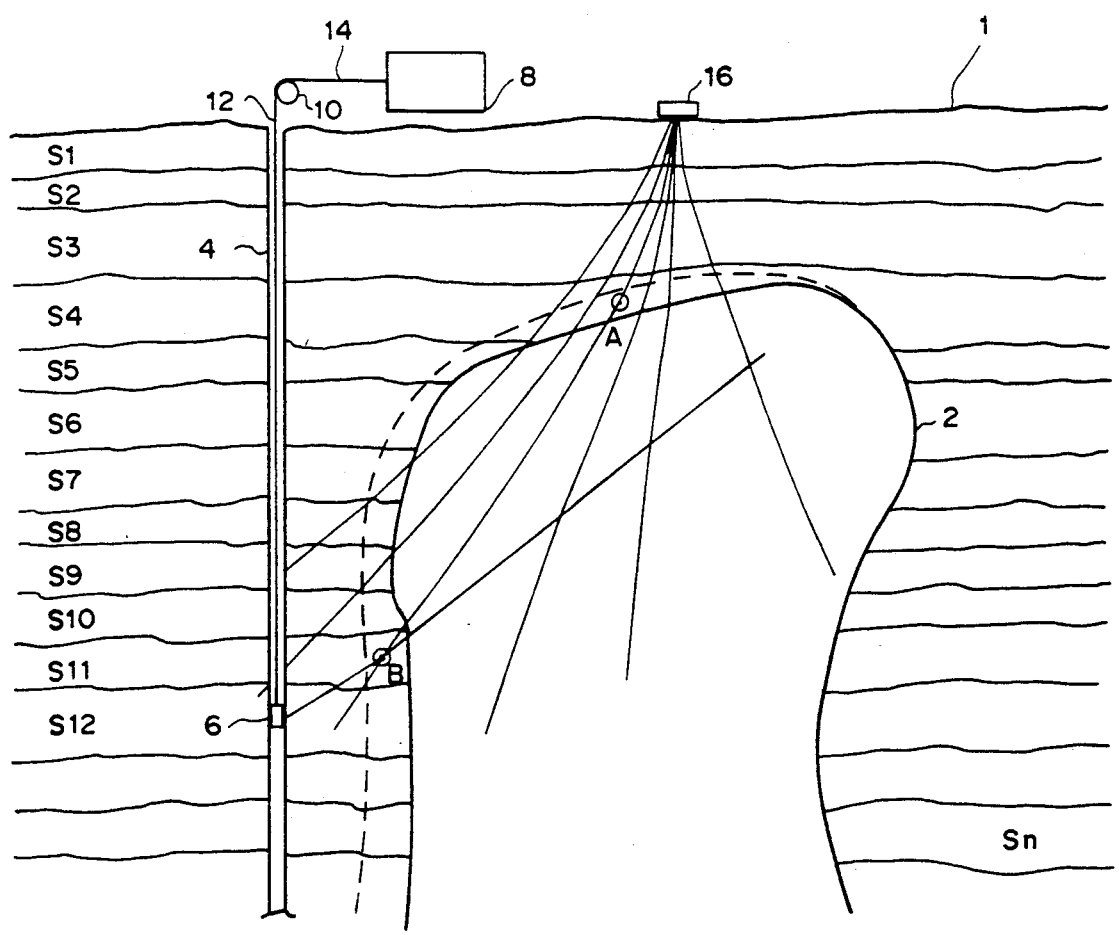
fig. 5b fig. 6a
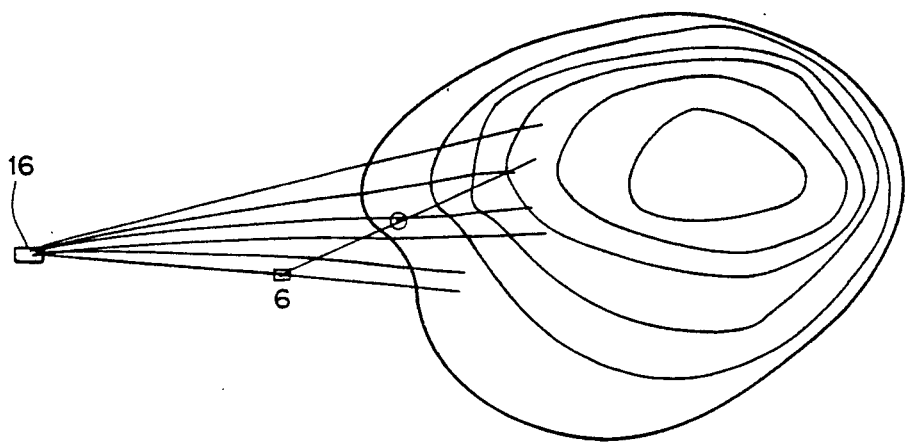
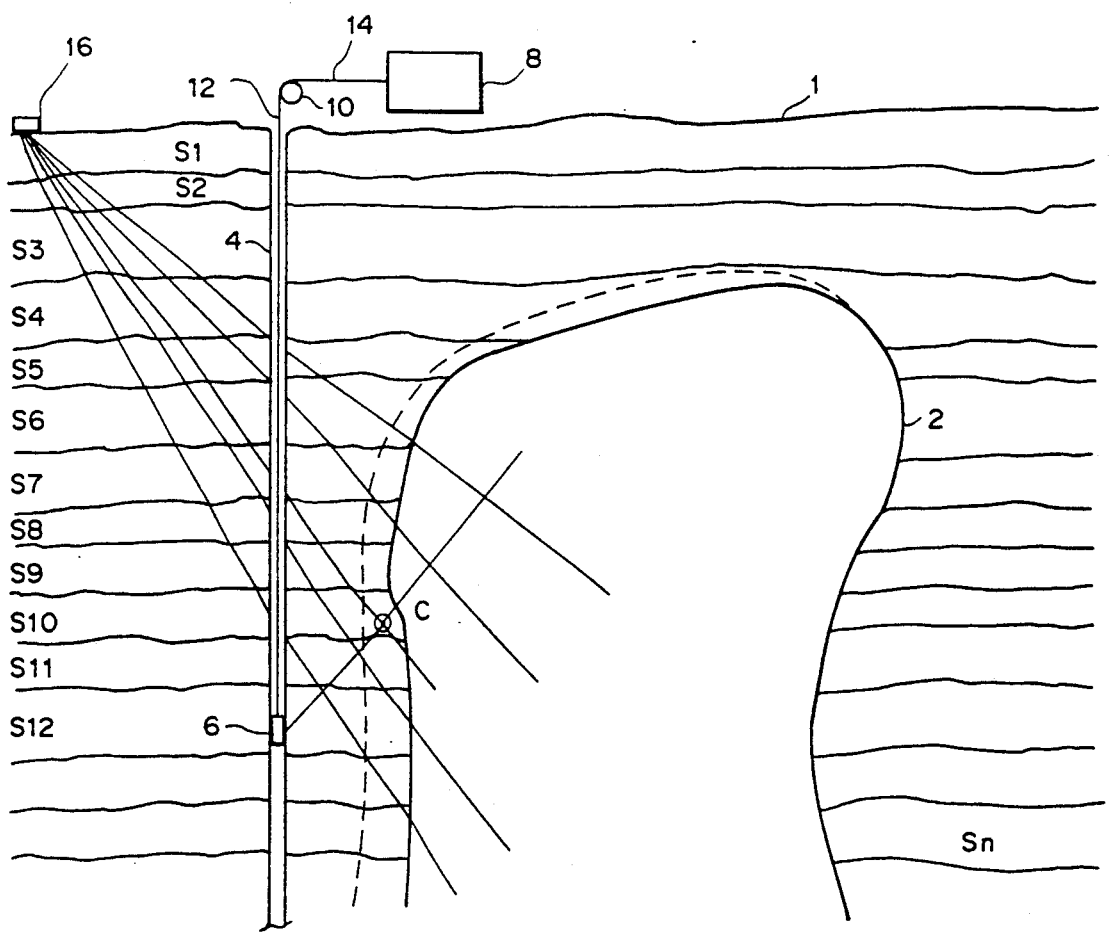
fig. 6b

3-D MAPPING OF SALT DOMES

This application is a continuation, of application Ser. No. 07/748,571, filed Aug. 22, 1991, now abandoned which was a continuation of application Ser. No. 07/497,495 filed Mar. 22, 1990, now abandoned.

BACKGROUND OF THE INVENTION

1. Field of the Invention

This invention relates to the use of seismic signals to delineate subsurface structures. More specifically, it relates to the use of refracted and reflected seismic signals to locate acoustic impedance boundaries such as the sides of salt domes.

2. Background of the Invention

Petroleum deposits are frequently found in traps formed around salt domes. The location of the top of a salt dome is typically mapped with seismic sources and receivers positioned at the earth's surface. See, for example, U.S. Pat. No. 4,835,745, issued May 30, 1989 to Young et al and U.S. Pat. No. 4,803,668, issued Feb. 7, 1989 to Berryhill et al.

It has been difficult, however, to map precisely the location of the interface between the sides of the salt domes and the surrounding structure. Methods known to the prior art for mapping the sides of salt domes have utilized both reflection and refraction techniques.

In the refraction method known to the prior art, normally, a seismic signal is generated at the surface over the salt dome and the resulting signal is detected in a wellbore near the side of the salt dome after the signal has travelled through a part of the salt dome. In the refraction method known to the prior art, the signal travel path was assumed to lie within a vertical plane which intersected the source and receiver locations. For each source-receiver location, the time required for the signal to travel to the receiver was measured. Previously determined information regarding the seismic velocity of the earth strata surrounding the borehole was then utilized to calculate the possible arrival paths within the assumed vertical plane of travel over a selected arc. Possible transmission paths from the source within the vertical plane were then generated, utilizing previously determined information regarding the location and shape of the top of the salt dome, the velocity profile of the strata overlying the salt dome and the velocity in the salt dome. From the previously determined velocity information, the travel time along each of the calculated paths is determinable, and locations at which a travel line from the source intersects a line of travel from the receiver, where the combined calculated travel time from the source to the intersecting location and from the receiver to the intersecting location equals the measured travel time, yields a possible travel line from source to receiver. For each source-receiver location, a plurality of intersecting points, substantially defining an aplanatic curve is determined. Each of these intersecting locations is a possible location of the salt dome boundary. In general, it was not possible to determine for a single source-receiver location which of these intersecting points represented the actual interface between the salt dome and the surrounding formation. However, by detecting the seismic signal at a large number of different depths in the wellbore, a set of aplanatic curves will be generated and an envelope of a set of such curves will described the shape of the salt face.

The reflection method of determining the interface of the sides of a salt dome is shown in U.S. Pat. No. 3,483,505, issued Dec. 9, 1969. In the reflection method, a seismic signal is initiated, either at the surface or within a wellbore adjacent the salt dome, and the signal reflected from the salt dome interface is detected by receivers in the wellbore or at the surface.

As in the refraction method known to the prior art, the travel path of the reflected signal was assumed to lie within a vertical plane intersecting the source and receiver locations. Previously determined information regarding the seismic velocity of the earth strata through which the signal travels was utilized to determine possible locations of the reflecting interface.

Because these prior art methods assumed that the entire travel paths of the seismic signal was within a vertical plane, errors were introduced when the travel path deviated from the vertical plane.

It is an object of the present invention to more accurately define the location of an acoustic impedance boundary below the earth's surface, such as the interface between a salt dome and the surrounding sediment.

SUMMARY OF THE INVENTION

In accordance with the invention, there is provided a system for determining the location of an acoustic impedance boundary within the earth. A seismic signal is generated at a first location and detected at a second location so that the signal travels from the source to the acoustic impedance boundary and from the acoustic impedance boundary to the sensor. In a first embodiment, the travel time from source to receiver and the direction, in three dimensions, of the arrival path of the signal at the sensor are determined. Utilizing the determined direction of travel to the sensor and known information regarding the velocity profile of the earth strata between the source and the acoustic impedance boundary and between the receiver and the acoustic impedance boundary, a calculated travel path from the source to receiver is determined over which the calculated travel time substantially equals the measured travel time. The location of the acoustic impedance boundary is determined from the point of intersection of a calculated travel path extending from the source with a calculated travel path extending from the wellbore sensor, for which the calculated travel time substantially equals the measured travel time.

In a further embodiment of the invention, an acoustic impedance boundary, such as the boundary of a salt dome, is located without determining the arrival vector of the seismic signal at the sensor. The seismic signal is either generated at the surface or in a wellbore. The signal is either reflected from, or refracted through, the side of the salt dome and then detected by a sensor. Possible travel paths of the seismic signal from the source and travel paths to the sensor, and the travel times along these paths, are calculated using existing velocity profiles. The intersecting locations at which the combined travel time from the source to the intersecting location and from the intersecting location to the sensor equals the measured travel time from the source to the sensor are possible locations of the salt dome interface. These intersecting locations will define a segment of an ellipsoid which will define the closest locations that the salt dome may be to the source location. If a sufficient number of source-receiver locations are utilized, and the resulting ellipsoidal segments defined, the location of the salt dome face may be determined from the tangential surface defined by the ellipsoidal segments.

BRIEF DESCRIPTION OF THE DRAWINGS

FIGS. 1A and 1B show the travel path of a seismic signal determined in accordance with a first embodiment of the present invention;

FIGS. 2A and 2B show the travel path of a seismic signal determined in accordance with a second embodiment of the present invention;

FIGS. 5A and 5B show the possible travel paths for seismic signals refracted through a salt dome between a source and receiver;

FIGS. 6A and 6B show the possible travel paths calculated for a signal reflected from the side of a salt dome.

DESCRIPTION OF THE PREFERRED EMBODIMENT

Figure 3:
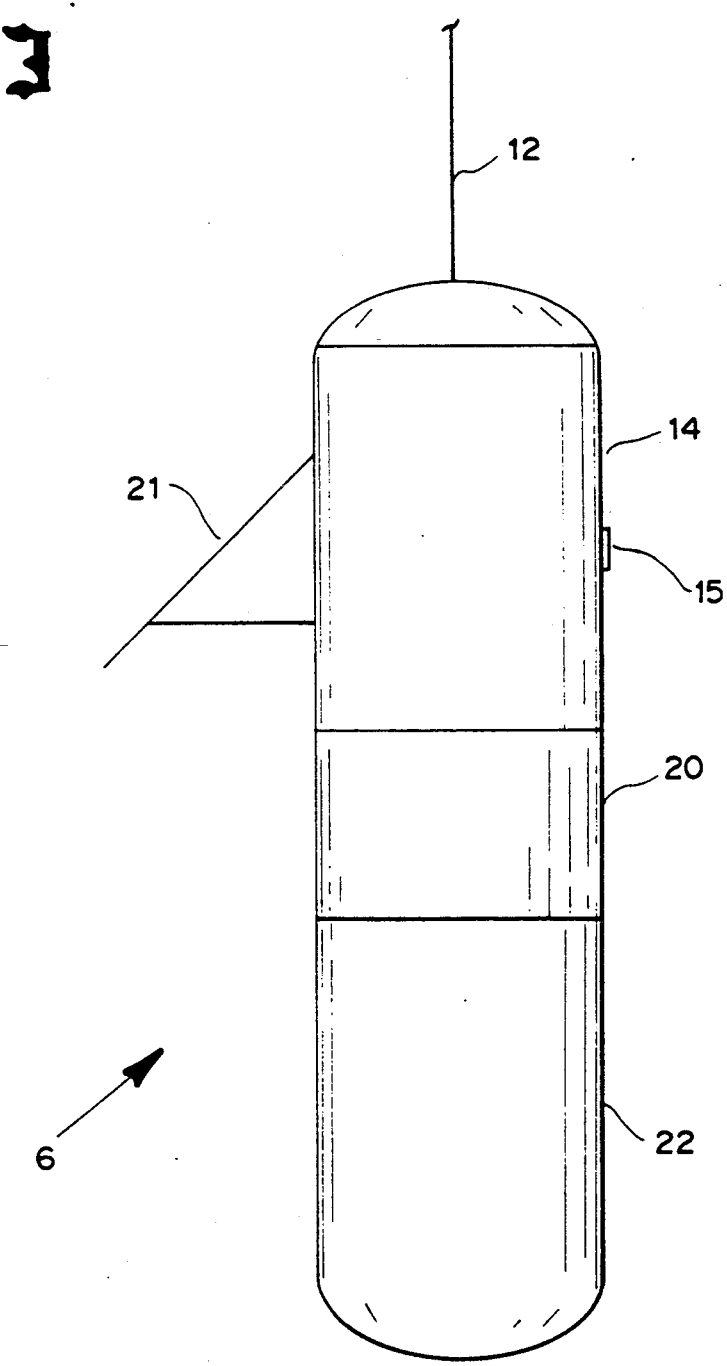
FIG. 3 shows a diagram of a wellbore tool utilized in the practice of the present invention.

The present invention is a method for determining the location of a subsurface acoustic impedance boundary such as the location of the side of a salt dome. In a first embodiment of the invention, a seismic signal which is detected after being refracted through the side of the salt dome is utilized to determine the location of the side of the salt dome. In a second embodiment of the invention, a seismic signal which has been reflected from the side of the salt dome is utilized to determine the location of the side of the salt dome.

FIGS. 1A and 1B illustrate signal generation and detection according to the first embodiment of the invention. FIG. 1B shows a cross-section of a salt dome 2 below the earth's surface 1. A tool 6 is lowered into a well 4, which normally will be located near the salt dome. The tool 6 is suspended from a well logging cable which passes over a sheave wheel 10. Normally, the well logging cable 12 will include a number of electrical control and data signal transmission lines therein, and may also include hydraulic control lines. The cable 12 will include a data transmission path 14 therein, which conducts detected signals from the tool 6 to recording and control installation 8. Recording and control installation 8 is adapted to record signals from tool 6 which are generated in accordance with this invention. Typically, the data transmission path will comprise electrical conductors, but optical fibers or other transmission paths might also be used.

As shown in FIG. 1B, the earth's subsurface includes a number of strata S1-Sn having different seismic velocity characteristics. In practicing the present invention, a velocity profile of the subsurface strata overlying the salt dome and to the sides of the salt dome is utilized. Methods of generating such profiles are known to the prior art, and will not be discussed herein. Use of the velocity profile enables the refraction angle to be determined for a seismic signal as it passes through the interface between strata having different seismic velocities. It is well known to the prior art that when a seismic signal passes through an interface between two strata having different seismic velocities, the angle at which the wave front leaves the interface is related to the angle at which it approaches the interface as follows:

$$\frac{\sin i}{\sin r} = \frac{V_1}{V_2}$$

where
 i = is the angle between the interface and the approaching ray path
 r = is the angle between the interface and the refracted ray path
 $V_1$ = is the seismic velocity of the strata on the approach side of the interface
 $V_2$ = is the seismic velocity of the strata on the refraction side of the interface.

As shown in FIGS. 1A and 1B, in a first embodiment of the invention, a seismic signal is generated at location 16. In a preferred embodiment of the invention, the source may be an air gun or air gun array, although other seismic sources may be utilized. It is understood that the invention may be practiced in water-covered areas of the earth, and that stratum S1 may be water. The signal travels down into the earth where it is shown refracted from stratum S1 into stratum S2; from stratum S2 into stratum S3; from stratum S3 into stratum S4; and then into the salt dome. From the salt dome, it is refracted into stratum S11 and then into stratum S12, in which sensor 6 is located in the wellbore. The tool 6 which includes the seismic detector is normally lowered in succession to a number of discrete depths within the wellbore and measurements made at each depth.

In a preferred embodiment, as shown in FIG. 3, the tool 6 includes a gimballed, three-component geophone assembly 14 adapted for coupling to the formation. An example of a geophone that may be used for this purpose is the LRS-1300 Model three-component geophone made and marketed by the LRS Division of Western Atlas International, Inc., which is further described in U.S. Pat. No. 4,893,290. Also included in the tool 6 is a borehole gyroscope package 22. The gyroscope package 22 is coupled to the geophone assembly 14 by means of isolation subassembly 20 so that the gyroscope retains a fixed orientation with respect to the geophone orientation.

The isolation subassembly 20 is included between the gyroscope 22 and the geophone assembly 14 for mechanical isolation. The inclusion of isolation subassembly 20 prevents the generation of resonant frequencies in the geophone assembly within the seismic frequency band which could develop because of the additional length of the tool, if the gyroscope assembly were coupled directly to the geophone assembly. Isolation subassembly 20 may be a flexible sleeve having the capacity to physically suspend gyroscope package 22 from the geophone assembly and having sufficient torsional stiffness to maintain the alignment between the gyroscope package and the geophone assembly. The tool 6 will normally include means such as actuator arm 21 for urging the tool against the wall of the wellbore so that a sensor, such as sensor 15, can make contact with the borehole wall.

Geophone assembly 14 comprises a three-component geophone which is configured so that each of the three geophones senses motion in a different one of three orthogonal directions. By recording the waveform of the arriving signal in each of the three orthogonal directions, the vector by which a seismic signal reaches the geophones may be determined. One of the geophones is normally oriented to detect vertical motion. The other two geophones of the three-component geophone assembly will be oriented in the horizontal plane but normally it is not practical to control the orientation of the two horizontal geophones with respect to true north.

As discussed previously, in the method known to the prior art, it was assumed that the seismic signal travelled within a single vertical plane from the source to the receiver. FIGS. 1A and 1B show a propagation path of a seismic signal from the source location 16 to the detector 6 which passes through salt dome 2 and which is not confined to a vertical plane. Typically, the seismic velocity in a salt dome is about 15,000 ft./sec. whereas the velocity in the surrounding earth strata may be about 7,000 ft./sec. Accordingly, the shortest travel path, in time, between a source and detector may not be the shortest travel path, in distance. FIG. 1B shows a vertical cross-section of the salt dome outlined by a solid line in a vertical plane which includes a seismic source and a receiver location. The dotted line in FIG. 1B shows projections of the salt dome behind the cross-sectional plane, which extend closer to the source and to the detector than any portion of the salt dome within the cross-sectional plane which includes the source and receiver locations. FIG. 1A is a plan view further illustrating these irregular features. Accordingly, the seismic signal travel path of least time will deviate from a vertical plane. The travel path might, for example, enter the salt dome at location A and leave the salt dome at location B.

Figure 4B:
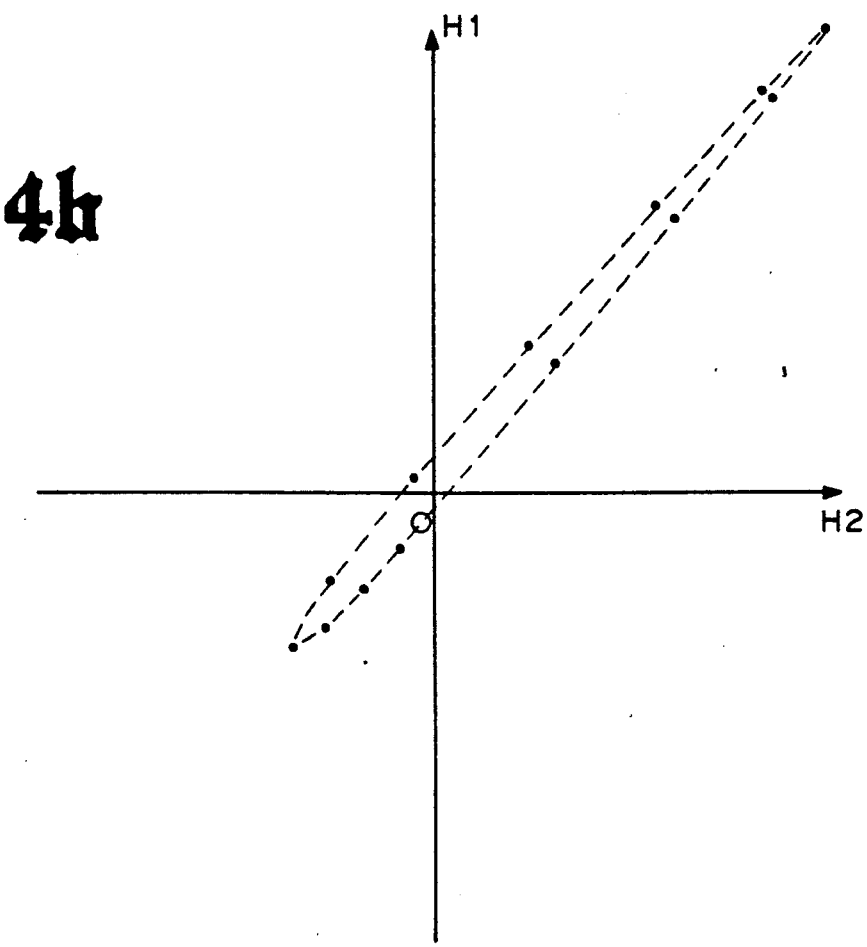
FIG. 4b shows a hodogram of signals detected by two horizontally oriented orthogonally disposed geophones.
Figure 4A:
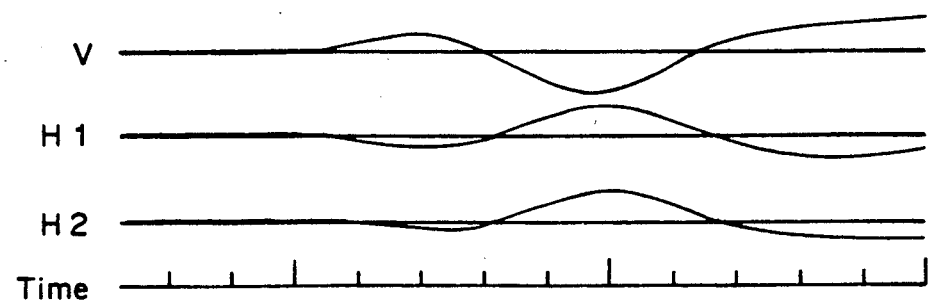
FIG. 4a shows a signal waveform detected by a three component geophone in a wellbore.
Figure 7:
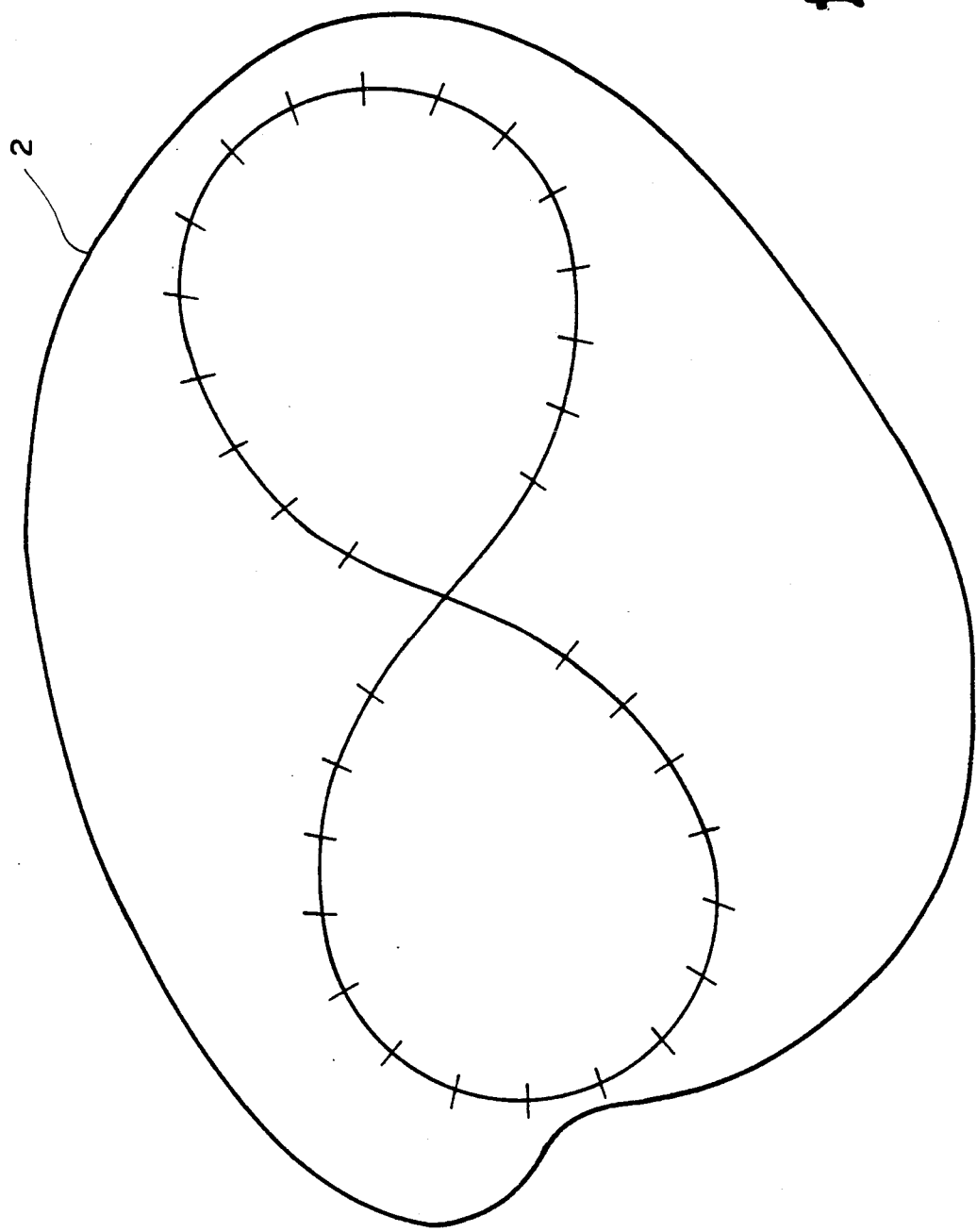
FIG. 7 shows the generation of a seismic signal at a plurality of locations above a salt dome.

FIG. 4a shows possible waveforms that might be detected by the three-component geophone, where H1 and H2 are the signals detected by two geophones orthogonally oriented in the horizontal plane and V is the signal detected by the vertically oriented geophone. To determine the arrival angle of the seismic signal in the horizontal plane, a hodogram is generated from the H1 and H2 signals. From the resulting hodogram, shown in FIG. 4b, it can be seen that the signal arrives at about a 45° angle referencing H1 and H2. Measurements made with gyroscope 22 determine the orientation of the geophones with respect to true north. Therefore, the arrival angle, with respect of truth north, of the seismic signal at the geophone is determinable from the orientation of the arrival path of the seismic signal with respect to the two orthogonal horizontal geophones, and the orientation of the geophones with reference to true north. By generating a second hodogram using the signal detected by the vertical geophone and the hodogram generated from the two horizontal geophones, a second hodogram is generated which determines the direction from which the seismic signal reaches the geophones in three-dimensional space.

The actual travel time of the seismic signal from the source to the receiver must be measured. Methods of measuring the travel time are known to those of ordinary skill in the art. The time of reception of the signal by receiver 6 in the wellbore in the embodiment illustrated in FIGS. 1A and 1B is determined by observing the "first break" on the recorded signal. Normally, the initiation of the source is controlled electronically so that the precise time of this signal initiation is also determined and recorded.

The location of the salt dome interface is determined by:
(a) projecting lines of travel from the source location;
(b) projecting lines of travel from the receiver location;
(c) calculating travel times along the lines of travel from the source location and the receiver location;
(d) determining the locations at which lines of travel from the source location substantially intersect lines of travel from the receiver location;
(e) for the intersecting travel lines, determining the combined seismic travel time between the source location and the intersecting location and between the intersecting location and the receiver location; and
(f) determining the intersecting lines of travel for which the calculated travel time equals the measured travel time from source to receiver.

As described above, in a first embodiment of the invention, the travel path by which the seismic signal reaches the geophones in the wellbore is substantially determinable with the use of a three-component geophone and a gyroscope. Because the velocity profile of the strata around the salt dome is known, the travel path of the seismic signal can be projected backward from the receiver toward the source. The propagation path of the seismic signal from the source, however, is not known. Therefore, in a particular implementation of the invention, a large number of possible travel paths are selected projecting from the seismic source within a conical volume. The number of computed paths may be 300, for example, within a 10° arc cone.

In a particular embodiment of the invention, the projection of possible ray paths from the source toward the receiver and from the receiver toward the source are generated with the aid of a computer program implemented in a digital computer of a type typically used in the industry. In projecting the ray paths, the volume within which the seismic signal could travel is divided into incremental cubes. Typically, these cubes may be ten meters square. Because the velocity profile of the earth strata is known, a seismic velocity may be assigned to each incremental cube, and the path and travel time of each of the projection paths may be calculated through successive incremental cubes. In computing travel paths from the source, the velocity profile of the strata overlying the salt dome and that of the salt dome is utilized, but since the location of the side of the salt dome is unknown, the travel paths from the source are computed as if the salt dome extended indefinitely. In computing travel paths projecting from the receiver toward the source, the boundary of the side of the salt dome is also ignored and the travel path is computed as if only the earth strata which exist outside the salt dome were present.

Although the arrival path of the seismic signal at the wellbore receiver is accurately measured with the three-component geophones, some measurement error may be present; therefore, it may be desirable to allow the possible travel path of the seismic signal as it approaches the receiver to vary over an arc cone having an apex at the receiver. A plurality of possible paths (300, for example) and travel times are computed within the incremental cubic volumes within the arc cone.

FIGS. 5A and 5B illustrate a number of the computed travel paths. A much larger number of possible paths are normally computed than are shown on the figure, but only a few are shown for clarity.

A number of the travel paths emanating from the source and from the receiver will intersect. For each pair of intersecting paths the combined calculated travel times from the source to the location of intersection and from the sensor to the location of intersection are determined from the velocity profiles. The ensemble of points where the travel paths intersect, and for which the calculated travel time from source to receiver substantially equals the measured travel time will define a tesselated plane. This surface then defines a boundary of the side of the salt dome.

For situations where the signals detected by the geophone assembly 14 and the gyroscope 22 are of high quality, a single travel path of the seismic signal to the sensor may be calculated, in which case there will be only one location of intersection where the travel time from the source to a point of intersection and from the point of intersection to the detector equals the measured travel time of the seismic signal. The boundary of the side of the salt dome is then defined by a single intersecting point.

A second embodiment of the invention is illustrated in FIGS. 2A and 2B. This embodiment of the invention utilizes a reflection from the side of the salt dome rather than a refraction through the salt dome interface. FIG. 2B is an elevational view showing a seismic signal generated at location 36, which is detected in the wellbore by receiver 6 after being reflected from the side of the salt dome 2. Although the same three-component geophone may be utilized to detect the seismic signal that is used with the refraction embodiment, it is not necessary to utilize the gyroscope measurement to determine the orientation of the geophone in the wellbore because, normally, the location of the source with reference to the detector in the wellbore is known. A "first arrival", i.e., the signal travelling directly from source to receiver, along path 38, will be detected by the receiver 6 prior to detection of the signal reflected from the salt dome. A hodogram, generated from this "first arrival" signal, is then utilized to define the orientation of the horizontal geophones. Hodograms, generated from the signal reflected from the side of the salt dome and detected by the sensor 6, are then utilized to determine the direction of travel of the seismic signal reflected from the salt dome as it arrives at the sensor.

The steps for determining the location of the salt dome interface are substantially the same as those for determining the interface in the embodiment of the invention in which refracted signals are utilized as previously described herein. The actual travel time between the source and receiver of the signal reflected from the salt dome interface will need to be measured, and the velocity profile through which the signal travels needs to be known. Possible travel paths of the seismic signal from the source within a selected conical volume are calculated, as shown in FIGS. 6A and 6B, as well as the travel time of the seismic signal to each incremental cubical volume through which the signal travels. From the geophone measurements and the velocity profile, the travel path of the seismic signal from the salt dome interface to the sensor is substantially determined. As with the refraction embodiment, a plurality of paths are normally computed, although, if the signal quality is good, only a single path to the sensor may be computed. The ensemble of points where the travel paths projecting from the source and from the receiver intersect, and for which the combined calculated travel time substantially equals the measured travel time, define a surface of the salt dome interface. If signal quality is high and only a single travel path of the seismic signal to the sensor is calculated, there will be only one location of intersection, and the boundary of the side of the salt dome is then defined by a signal intersecting point.

In another embodiment of the invention, the location of the salt dome interface is investigated without determining the arrival vector of the seismic signal at the sensor. In this embodiment, either a refracted or a reflected signal may be used. If a refracted signal is used, the signal is generated as illustrated in FIGS. 1A and 1B. If a reflected signal is used, the signal is generated as illustrated in FIGS. 2A and 2B. The embodiment is performed in the same manner as previously described with reference to FIGS. 5A and 5B and 6A and 6B except that a larger number of possible travel paths are normally developed extending toward the receiver.

Because the travel path of the seismic signal to the sensor is unknown, possible travel paths within a large selected volume extending from an apex at the sensor location through a substantially conical volume are calculated, using a previously generated velocity profile of the subsurface surrounding the wellbore. The velocity profile is utilized to determine incremental travel times along each of the calculated paths.

The travel time of the seismic signal from the source to the sensor is measured as described previously. For a refracted signal, the signal is refracted through the salt dome interface. For a reflected signal, the measured travel time is the time for the signal to travel from the source to the salt dome interface and back to the receiver.

Locations at which a calculated travel path extending from the source intersect a travel path extending from the receiver and for which the combined travel time along the intersecting paths equals the measured travel time define a possible location of the salt dome interface. For a given source and receiver location, these interface points will define a segment of an ellipsoidal surface. If a sufficient number of source-receiver locations are utilized, and the resulting ellipsoidal surfaces defined, the location of the face of the salt dome could be determined from a surface tangential to all ellipsoids. However, a very large number of calculations would be required and, generally, it will be more practical to utilize the previously described embodiment in which a three-component geophone is utilized to determine the vector by which the seismic signal arrives at the sensor. However, this embodiment may be conveniently utilized to define limits on where the salt dome interface could be located. Within the range of measurement error, the segment of an ellipsoid defines a surface which is the closest location that the salt dome interface could be to the receiver location. This information is useful if it is desired to drill a well where one can be certain that the well will not penetrate the salt dome.

Specific steps utilized in practicing the present invention may typically be performed in a digital computer. The generation of specific programming steps to implement the invention described herein may be generated by one of ordinary skill in the art and such steps will not be described herein.

Various changes in the details of the invention as described herein may be apparent to those skilled in the art. It is intended that such changes be included within the scope of the claims appended hereto.

We claim:
1. A method for determining the location of a side of a salt dome within the earth's subsurface, comprising:
generating a seismic signal with a seismic source at a first location;

detecting said seismic signal with a seismic sensor positioned at a second location so that a seismic signal travels from said first location to the side of said salt dome and from the side of said salt dome to said second location;

measuring the travel time of said seismic signal from the source to the sensor;

determining the direction in three dimensional space of the arrival path of the seismic signal at said sensor;

dividing into a first set of incremental cubes a volume within the earth's subsurface through which said seismic signal could travel to said sensor and assigning a seismic velocity to each incremental cube of said first set of incremental cubes based on a previously determined velocity profile to the earth's subsurface adjacent said second location to map a first travel path and travel time from said sensor through said first set of incremental cubes;

dividing into a second set of incremental cubes a volume within the earth's subsurface through which said seismic signal could travel from said source to substantially intersect said first travel path and assigning a seismic velocity to each incremental cube of said second set of incremental cubes based on a previously determined velocity profile to the earth's subsurface adjacent said first location and mapping a plurality of possible second travel paths within a three-dimensional space by which said seismic signal could travel from said source to substantially intersect said first travel path and the travel times along said second travel paths; and determining the location of intersection of said first travel path with one of said second travel paths such that the combined travel times along said intersecting paths from the source to the location of intersection and from the receiver to the location of intersection substantially equals said measured travel time.

2. The method of claim 1 wherein said first location is substantially at the earth's surface above the top of said salt dome and said second location is within a well bore positioned to a side of said salt dome and said seismic signal is refracted through the side of said salt dome and travels to said second location.

3. The method of claim 1 wherein said sensor measures motion in each of three orthogonal directions and the direction of travel as said seismic signal arrives at the sensor is determined from said three orthogonal measurements and the horizontal orientation of said sensor in said wellbore is determined from a gyroscope measurement made with a gyroscope having a known horizontal orientation with reference to said sensor.

4. The method of claim 1 wherein said first location is substantially at the earth's surface above the top of said salt dome and said second location is within a well bore positioned to a side of said salt dome and said first location is selected so that said seismic signal will be reflected from the side of said salt dome and travel to said second location.

5. A method of investigating the location of a side of a salt dome within the earth's subsurface, comprising:

generating a seismic signal with a seismic source at a first location;

detecting said seismic signal with a seismic sensor positioned at a second location so that a seismic signal travels from said first location to the side of said salt dome and from the side of said salt dome to said second location;

measuring the travel time of said seismic signal from the source to the sensor;

dividing into a first set of incremental cubes a volume within the earth's subsurface through which said seismic signal could travel to said sensor and assigning a seismic velocity to each incremental cube of said first set of incremental cubes based on a previously determined velocity profile to the earth's subsurface adjacent said second location and mapping a plurality of possible first travel paths and travel times within a three-dimensional space by which said seismic signal could travel to said sensor;

dividing into a second set of incremental cubes a volume within the earth's subsurface through which said seismic signal could travel from said source to substantially intersect said first travel path and assigning a seismic velocity to each incremental cube of said second set of incremental cubes based on a previously determined velocity profile of the earth's subsurface adjacent said first location and mapping a plurality of possible second paths and travel times within a three-dimensional space by which said seismic signal could travel from said source to substantially intersect said first travel paths; and determining the locations of intersection of said first travel paths with said second travel paths such that the combined travel times along said intersecting paths from the source to the location of intersection and from the receiver to the location of intersection substantially equals said measured travel time.

6. The method of claim 5 wherein said first location is substantially at the earth's surface above the top of said salt dome and said second location is within a well bore positioned to a side of said salt dome and said seismic signal is refracted through the side of said salt dome and travels to said second location.

7. The method of claim 5 wherein said first location is substantially at the earth's surface above the top of said salt dome and said second location is within a well bore positioned to a side of said salt dome and said first location is selected so that said seismic signal will be reflected from the side of said salt dome and travel to said second location.

* * * * *